(12) United States Patent
Wang et al.

(10) Patent No.: US 11,605,137 B2
(45) Date of Patent: Mar. 14, 2023

(54) EXPENSE REPORT SUBMISSION INTERFACE

(71) Applicant: Oracle International Corporation, Redwood Shores, CA (US)

(72) Inventors: Winston Leonard Wang, San Francisco, CA (US); Parker Ralph Kuncl, Seattle, WA (US); Kelly Bailey, San Francisco, CA (US); Matthew Brigante, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 18 days.

(21) Appl. No.: 17/017,393

(22) Filed: Sep. 10, 2020

(65) Prior Publication Data

US 2021/0073922 A1 Mar. 11, 2021

Related U.S. Application Data

(60) Provisional application No. 62/898,718, filed on Sep. 11, 2019.

(51) Int. Cl.
*G06Q 40/00* (2012.01)
*G06Q 10/10* (2012.01)
(Continued)

(52) U.S. Cl.
CPC ........... *G06Q 40/12* (2013.12); *G06F 16/243* (2019.01); *G06F 16/248* (2019.01); *G06N 20/00* (2019.01);
(Continued)

(58) Field of Classification Search
None
See application file for complete search history.

(56) References Cited

U.S. PATENT DOCUMENTS

| 6,029,144 A | 2/2000 | Barrett et al. |
| 9,892,106 B1 * | 2/2018 | Lesner .................. G06Q 50/26 |
| (Continued) | | |

OTHER PUBLICATIONS

Suponenkovs, Artjoms, et al. "Application of image recognition and machine learning technologies for payment data processing review and challenges." 2017 5th IEEE Workshop on Advances in Information, Electronic and Electrical Engineering (AIEEE). IEEE, 2017 (Year: 2017).*

(Continued)

*Primary Examiner* — Darlene Garcia-Guerra
(74) *Attorney, Agent, or Firm* — Invoke

(57) ABSTRACT

Techniques for expense report submission are disclosed. An expense report submission system receives, via a graphical user interface, a user query that corresponds to requesting whether a particular expense is allowed. The expense report submission system applies the user query to a machine learning model configured to evaluate data associated with expenses against one or more expense policy rules. The expense report submission system generates a response to the user query based at least on a result of applying the user query to the machine learning model. The response to the user query indicates whether the expense is allowed based at least on the expense reporting rule(s). The expense report submission system presents, in the graphical user interface, the response to the user query.

20 Claims, 7 Drawing Sheets

(51) Int. Cl.
*G06F 16/248* (2019.01)
*G06F 16/242* (2019.01)
*G06N 20/00* (2019.01)
*G06Q 10/06* (2012.01)
*G06Q 40/12* (2023.01)
*G06Q 10/0639* (2023.01)

(52) U.S. Cl.
CPC ......... *G06Q 10/0639* (2013.01); *G06Q 10/10* (2013.01)

(56) References Cited

U.S. PATENT DOCUMENTS

| | | | |
|---|---|---|---|
| 10,235,720 B2 | 3/2019 | Abraham et al. | |
| 10,592,544 B1* | 3/2020 | Dasgupta | G06N 3/08 |
| 10,878,514 B2* | 12/2020 | Bender | G06Q 20/3224 |
| 11,423,451 B1* | 8/2022 | Chaudhari | G06N 20/00 |
| 2006/0206506 A1 | 9/2006 | Fitzpatrick | |
| 2009/0055270 A1* | 2/2009 | Magdon-Ismail | G06F 16/957 705/14.27 |
| 2009/0265232 A1 | 10/2009 | Gopalakrishnan et al. | |
| 2010/0017316 A1 | 1/2010 | Joseph et al. | |
| 2012/0185368 A1* | 7/2012 | Schloter | G06Q 40/00 705/30 |
| 2012/0317003 A1* | 12/2012 | McGrane | G06Q 10/06 705/30 |
| 2013/0041792 A1* | 2/2013 | King | G06Q 50/00 705/30 |
| 2014/0046812 A1* | 2/2014 | Fan | G06Q 40/00 705/30 |
| 2014/0122146 A1 | 5/2014 | Deist et al. | |
| 2016/0078566 A1* | 3/2016 | Farrell | G06Q 10/10 705/30 |
| 2016/0171557 A1 | 6/2016 | Fanous et al. | |
| 2016/0350867 A1 | 12/2016 | Votaw et al. | |
| 2016/0358268 A1 | 12/2016 | Verma et al. | |
| 2018/0012268 A1* | 1/2018 | Simantov | G06F 16/93 |
| 2018/0075391 A1* | 3/2018 | Chung | G06Q 40/125 |
| 2018/0137576 A1 | 5/2018 | Chu et al. | |
| 2018/0350006 A1 | 12/2018 | Agrawal et al. | |
| 2019/0014488 A1 | 1/2019 | Tan et al. | |
| 2019/0065564 A1* | 2/2019 | Twig | G06Q 10/025 |
| 2019/0102392 A1* | 4/2019 | Tseretopoulos | G06Q 30/04 |
| 2019/0116187 A1 | 4/2019 | Gahnoog et al. | |
| 2019/0236095 A1* | 8/2019 | Achan | G06F 16/9535 |
| 2019/0236552 A1 | 8/2019 | Rouseau et al. | |
| 2019/0303781 A1* | 10/2019 | Clark | G06K 9/6256 |
| 2019/0378050 A1 | 12/2019 | Edkin et al. | |
| 2019/0378136 A1* | 12/2019 | Efraim | G06Q 10/06312 |
| 2020/0020015 A1* | 1/2020 | Anders | G06Q 50/01 |
| 2020/0058078 A1 | 2/2020 | Li et al. | |
| 2020/0065912 A1 | 2/2020 | Bender et al. | |
| 2020/0074359 A1* | 3/2020 | Subramanian | G06N 5/02 |
| 2020/0118137 A1* | 4/2020 | Sood | G06N 20/00 |
| 2020/0234297 A1 | 7/2020 | Murray et al. | |
| 2020/0272309 A1 | 8/2020 | Xiao et al. | |
| 2020/0279219 A1* | 9/2020 | Desai | G06F 16/355 |
| 2020/0311729 A1* | 10/2020 | Matthews | G06Q 20/322 |
| 2021/0398118 A1 | 12/2021 | Stark et al. | |

OTHER PUBLICATIONS

Bozkus, Zeki, Christophe Bisson, and Taner Arsan. "Analytical expense management system." 2009 First International Conference on Networked Digital Technologies. IEEE, 2009 (Year: 2009).*

Iyengar, Vijay S., et al. "Analytics for Audit and Business Controls in Corporate Travel and Entertainment." AusDM 7 (2007): 3-12 (Year: 2007).*

* cited by examiner

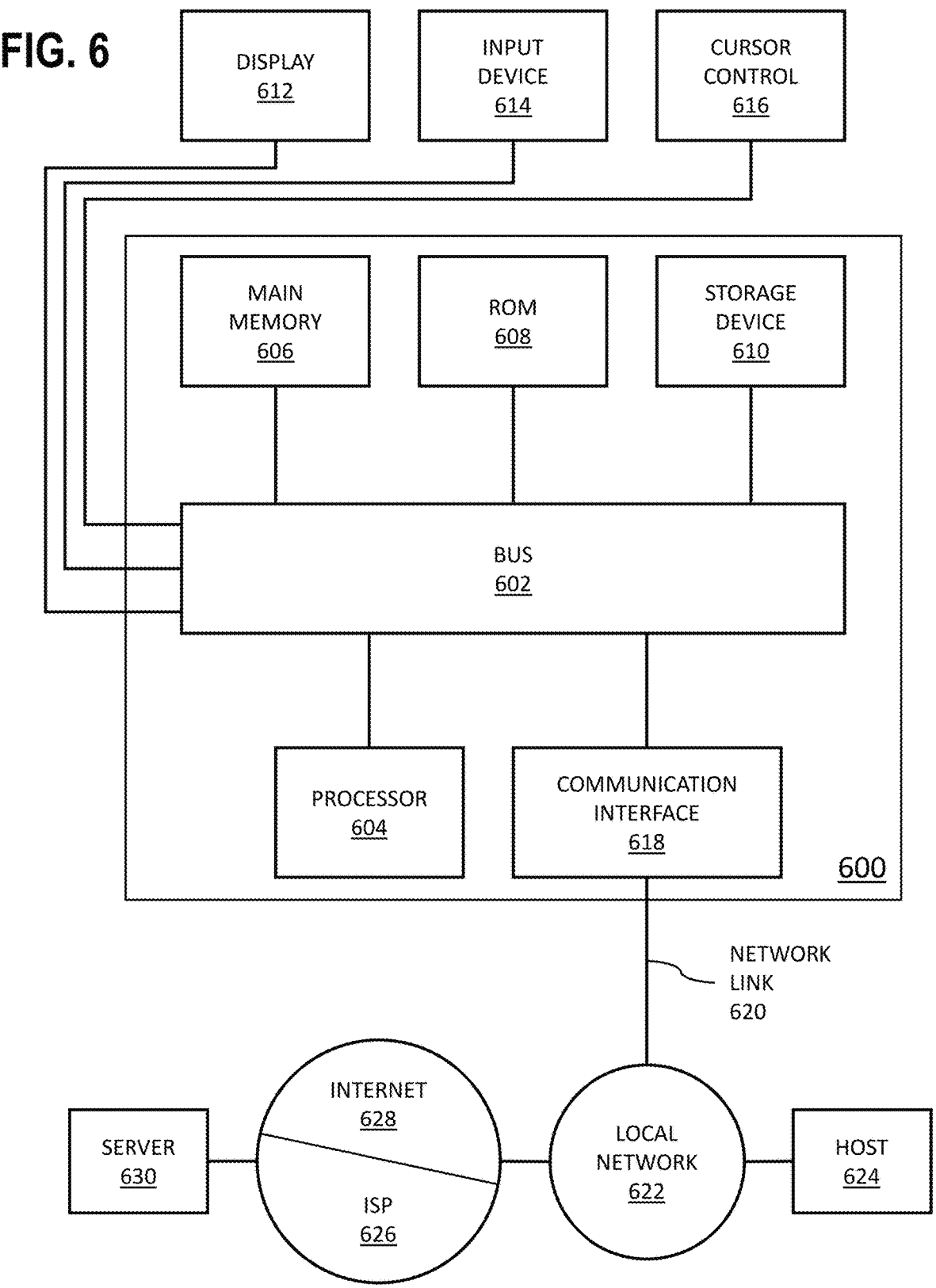

EXPENSE REPORT SUBMISSION INTERFACE

BENEFIT CLAIM; RELATED APPLICATIONS; INCORPORATION BY REFERENCE

This application claims the benefit of U.S. Provisional Patent Application 62/898,718, filed Sep. 11, 2019, which is hereby incorporated by reference.

This application is related to: U.S. Provisional Patent Application 62/898,699, titled "Real-Time Expense Auditing System"; U.S. Provisional Patent Application 62/898,695, titled "Expense Report Generation System"; U.S. Provisional Patent Application 62/898,712, titled "Expense Report Reviewing Interface"; U.S. Provisional Patent Application 62/898,705, titled "Expense Receipt Processing System"; and U.S. Provisional Patent Application 62/898,724, titled "Reimbursable Expense Recommendation System". All of the aforementioned patent applications are hereby incorporated by reference.

TECHNICAL FIELD

The present disclosure relates to business expenses. In particular, the present disclosure relates to expense reporting.

BACKGROUND

During the course of business-related activity (e.g., domestic or international travel, site visits and/or other kinds of business meetings, meals with customers and/or prospective customers, routine business operations, promotional events, and/or any other kind of business-related activity or combination thereof), employees sometimes incur expenses that are reimbursable by their employer as business expenses. To obtain reimbursement for such expenses, an employee typically submits an expense report. An expense report is a report that includes one or more expense descriptions. Each expense description includes expense data that describes one or more business expenses incurred by the employee. Expense data may include but is not limited to: a name of the employee that incurred the expense, a date the expense was incurred, a type of expense, a reason for the expense, an amount of the expense, a venue corresponding to the expense, a business project associated with the expense, a number of employees that benefited from the expense. An expense description template or expense report template may define a set of mandatory and/or non-mandatory fields to be filled out when preparing an expense description or expense report.

Businesses typically impose limits on reimbursable business expenses. Each expense limit may apply to an entire organization, a particular business unit, and/or one or more particular employees. Expense auditing is the process of determining, for each expense described in an expense report, whether the expense is approved for reimbursement.

Generating and/or auditing expense reports may be subject to various kinds of errors and inefficiencies. If an employee neglects to include an incurred expense in an expense report, the employee may end up paying for that expense out-of-pocket. If an employee is not aware of an opportunity for reimbursement, the employee may fail to take advantage of that expense opportunity. If an employee fails to properly manage spending, the employee may incur expenses that are partially or wholly non-reimbursable. Because preparing expense reports manually is time-consuming, an employee may delay preparing an expense report and subsequently forget to include reimbursable expenses in the expense report. Some employees may habitually overspend relative to an expense limit, while other employees may habitually underspend relative to the same expense limit. Some employees may include non-reimbursable expenses in expense reports. Habitual overspending, underspending, and/or non-reimbursable expense reporting may adversely affect organizational and/or individual expense budgets. In addition, depending on the number of employees submitting expense reports and/or the complexity of the organization's expense reimbursement rules, auditing expense reports may be time-consuming and error-prone. Generating and/or auditing expense reports may be subject to many other kinds of errors and inefficiencies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with some embodiments.

DETAILED DESCRIPTION

Figure 1:
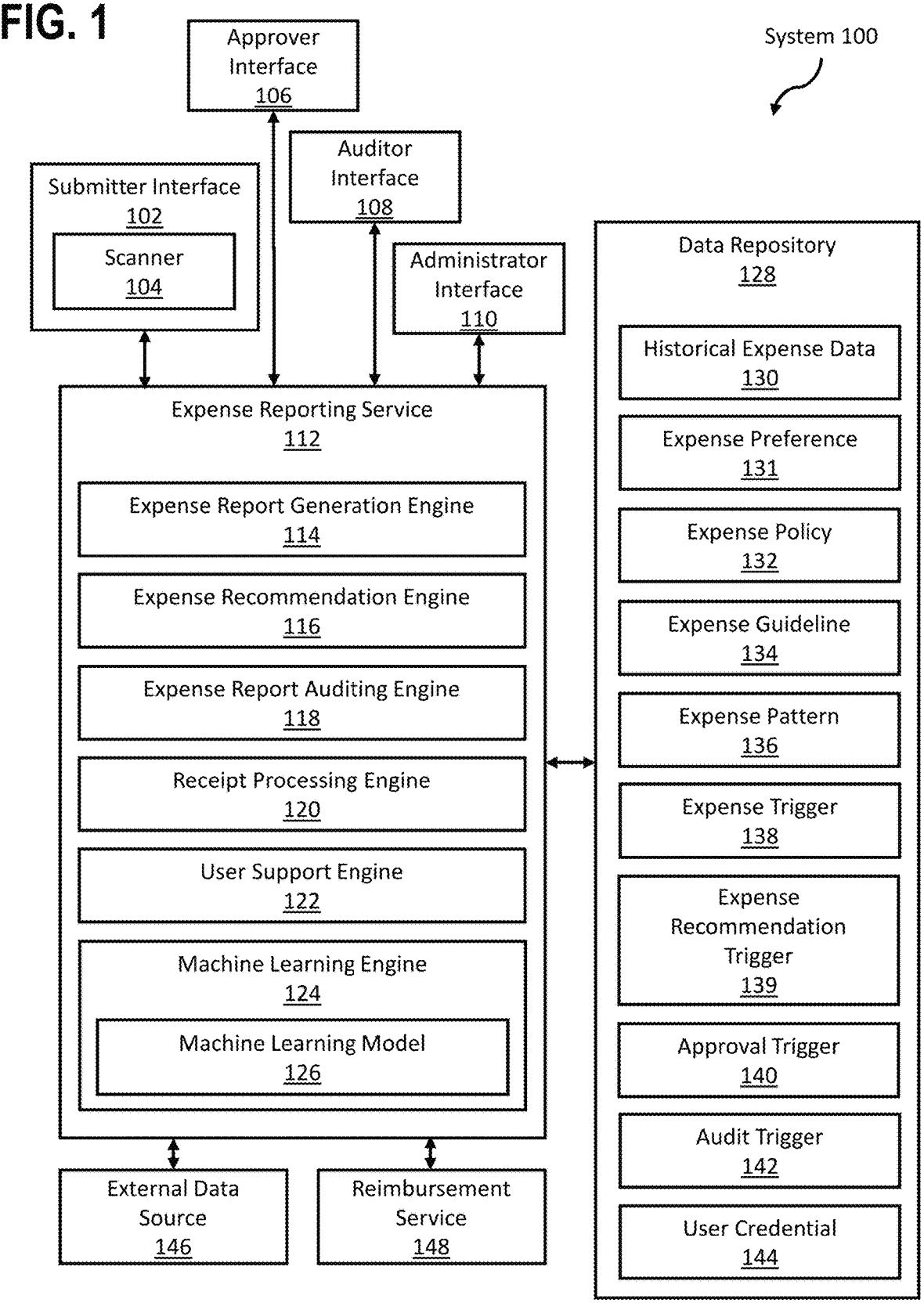
FIG. 1 illustrates a system in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. EXPENSE REPORT SUBMISSION
4. MACHINE LEARNING BASED QUERY PROCESSING
5. ILLUSTRATIVE EXAMPLES
6. HARDWARE OVERVIEW
7. COMPUTER NETWORKS AND CLOUD NETWORKS
8. MICROSERVICE APPLICATIONS
9. MISCELLANEOUS; EXTENSIONS

1. GENERAL OVERVIEW

Embodiments described herein improve the expense reporting experience for employees by providing, in a graphical user interface, responses to user queries relating to expense reporting. Employees may request whether expenses are reimbursable. Alternatively or additionally, the system may generate expense descriptions, generate expense reports, and/or submit expense reports responsive to user queries, optionally in a user-independent mode. Alternatively or additionally, some embodiments provide feedback about the employee's expense reporting behavior, including one or more system performance metrics. A system performance metric may be associated with operations performed by the system in a user-independent mode, thus encouraging the employee to take advantage of features in the system that permit user-independent expense reporting operations.

The expense reporting system may further leverage machine learning to facilitate and automate various aspects of processing expense reports and queries. In some embodiments, the expense reporting system learns how to classify and process expenses and activities based on a set of training examples. The expense reporting system may automatically learn what patterns are predictive of the likelihood that an activity incurs a reimbursable expense even though the patterns are not hard-coded into the expense reporting system. When a user submits a query about a new expense or activity, the expense reporting system may estimate an unknown label or classification for the newly queried example based on the learned patterns. The expense reporting system may generate response to the user query based on the estimated label.

In some embodiments, the techniques described herein are implemented by or interface with an intelligent agent, such as a virtual assistant persona. Users may submit natural language queries to the intelligent agent about whether expenses are reimbursable before the user incurs the expense. The intelligent agent may leverage natural language processing to map the query to intents and determine how to respond. The intelligent agent may further leverage the machine learning techniques described herein to predict whether an expense is reimbursable and formulate the natural language response. Additionally or alternatively, the intelligent agent may proactively provide suggestions to a user on expenses that may be reimbursed. The intelligent agent may automatically generate electronic expense report files and add entries to the files in a user-independent mode. Thus, expense reports may be generated with little to no user input, allowing for a "hands-free" expense reporting experience by the user.

One or more embodiments described in this Specification and/or recited in the claims may not be included in this General Overview section.

2. ARCHITECTURAL OVERVIEW

FIG. 1 illustrates a system 100 in accordance with some embodiments. As illustrated in FIG. 1, system 100 includes a submitter interface 102, an approver interface 106, an auditor interface 108, an administrator interface 110, an expense reporting service 112, a data repository 128, an external data source 146, a reimbursement service 148, and various components thereof. In some embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In some embodiments, each of submitter interface 102, approver interface 106, auditor interface 108, and administrator interface 110 refers to hardware and/or software configured to facilitate communications between a user and an expense reporting service 112. A submitter interface 102 may be used by a user, such as an employee, who is responsible for preparing and submitting expense descriptions and/or expense reports. The submitter interface 102 may be associated with one or more devices for obtaining visual media that represents a receipt for an expense, such as a scanner 104, a camera, a video device, or any other kind of device configured to capture visual media. An approver interface 106 may be used by a user, such as an employee in a managerial role, who is responsible for approving expense reports prior to submission for reimbursement. In some embodiments, expense reports are not subject to managerial approval prior to submission for reimbursement. An auditor interface 108 may be used by a user, such as an employee in an auditor role, who is responsible for auditing expense reports. An administrator interface 110 may be used by a user, such as an employee in an administrative role, who is responsible for determining and/or configuring parameters, rules, etc., that are used by an expense reporting service 112. One or more of a submitter interface 102, approver interface 106, auditor interface 108, and administrator interface 110 may be the same interface. A user may have multiple roles corresponding to submitter, approver, auditor, and/or administrator. For example, an employee who audits expense reports may also submit their own expense reports.

In some embodiments, a user interface (e.g., submitter interface 102, approver interface 106, auditor interface 108, and/or administrator interface 110) renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In some embodiments, different components of a user interface (e.g., submitter interface 102, approver interface 106, auditor interface 108, and/or administrator interface 110) are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface may be specified in one or more other languages, such as Java, C, or C++.

In some embodiments, an expense reporting service 112 includes an expense report generation engine 114. An expense report generation engine 114 refers to hardware and/or software configured to perform operations described herein (including such operations as may be incorporated by reference) for generating expense reports.

In some embodiments, an expense reporting service 112 includes an expense recommendation engine 116. An expense recommendation engine 116 refers to hardware and/or software configured to perform operations described herein (including such operations as may be incorporated by reference) for recommending expenses.

In some embodiments, an expense reporting service 112 includes an expense report auditing engine 118. An expense report auditing engine 118 refers to hardware and/or software configured to perform operations described herein (including such operations as may be incorporated by reference) for auditing expense descriptions and/or expense reports.

In some embodiments, an expense reporting service 112 includes a receipt processing engine 120. A receipt processing engine 120 refers to hardware and/or software configured to perform operations described herein (including such operations as may be incorporated by reference) for processing expense receipts.

In some embodiments, an expense reporting service 112 includes a user support engine 122. A user support engine 122 refers to hardware and/or software configured to perform operations described herein (including such operations as may be incorporated by reference) for processing and responding to user queries submitted to the expense reporting service 112.

In some embodiments, one or more components of the expense reporting service use a machine learning engine 124. Machine learning includes various techniques in the field of artificial intelligence that deal with computer-implemented, user-independent processes for solving problems that have variable inputs.

In embodiment, the machine learning engine 124 trains a machine learning model 126 to perform one or more operations. Training a machine learning model 126 uses training data to generate a function that, given one or more inputs to the machine learning model 126, computes a corresponding output. The output may correspond to a prediction based on prior machine learning. In some embodiments, the output includes a label, classification, and/or categorization assigned to the provided input(s). The machine learning model 126 corresponds to a learned model for performing the desired operation(s) (e.g., labeling, classifying, and/or categorizing inputs). An expense reporting service 112 may use multiple machine learning engines 124 and/or multiple machine learning models 126 for different purposes.

In some embodiments, the machine learning engine 124 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 124 receives positive and/or negative reinforcement in the process of attempting to solve a particular problem (e.g., to optimize performance in a particular scenario, according to one or more predefined performance criteria). In some embodiments, the machine learning engine 124 initially uses supervised learning to train the machine learning model 126 and then uses unsupervised learning to update the machine learning model 126 on an ongoing basis.

In some embodiments, a machine learning engine 124 may use many different techniques to label, classify, and/or categorize inputs. A machine learning engine 124 may transform inputs into feature vectors that describe one or more properties ("features") of the inputs. The machine learning engine 124 may label, classify, and/or categorize the inputs based on the feature vectors. Alternatively or additionally, a machine learning engine 124 may use clustering (also referred to as cluster analysis) to identify commonalities in the inputs. The machine learning engine 124 may group (i.e., cluster) the inputs based on those commonalities. The machine learning engine 124 may use hierarchical clustering, k-means clustering, and/or another clustering method or combination thereof. In some embodiments, a machine learning engine 124 includes an artificial neural network. An artificial neural network includes multiple nodes (also referred to as artificial neurons) and edges between nodes. Edges may be associated with corresponding weights that represent the strengths of connections between nodes, which the machine learning engine 124 adjusts as machine learning proceeds. Alternatively or additionally, a machine learning engine 124 may include a support vector machine. A support vector machine represents inputs as vectors. The machine learning engine 124 may label, classify, and/or categorizes inputs based on the vectors. Alternatively or additionally, the machine learning engine 124 may use a naïve Bayes classifier to label, classify, and/or categorize inputs. Alternatively or additionally, given a particular input, a machine learning model may apply a decision tree to predict an output for the given input. Alternatively or additionally, a machine learning engine 124 may apply fuzzy logic in situations where labeling, classifying, and/or categorizing an input among a fixed set of mutually exclusive options is impossible or impractical. The aforementioned machine learning model 126 and techniques are discussed for exemplary purposes only and should not be construed as limiting some embodiments.

In some embodiments, as a machine learning engine 124 applies different inputs to a machine learning model 126, the corresponding outputs are not always accurate. As an example, the machine learning engine 124 may use supervised learning to train a machine learning model 126. After training the machine learning model 126, if a subsequent input is identical to an input that was included in labeled training data and the output is identical to the supervisory signal in the training data, then output is certain to be accurate. If an input is different from inputs that were included in labeled training data, then the machine learning engine 124 may generate a corresponding output that is inaccurate or of uncertain accuracy. In addition to producing a particular output for a given input, the machine learning engine 124 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In some embodiments, a data repository 128 is any type of storage unit and/or device (e.g., a file system, database, collection of tables, or any other storage mechanism) for storing data. Further, a data repository 128 may include multiple different storage units and/or devices. The multiple different storage units and/or devices may or may not be of the same type or located at the same physical site. Further, a data repository 128 may be implemented or may execute on the same computing system as one or more other components of the system 100. Alternatively or additionally, a data repository 128 may be implemented or executed on a computing system separate from one or more other components of the system 100. A data repository 128 may be communicatively coupled to one or more other components of the system 100 via a direct connection or via a network.

In some embodiments, a data repository 128 is configured to store historical expense data 130. Historical expense data 130 may include any kind of data that the expense reporting service 112 has previously received and/or generated in association with expenses. Specifically, the historical expense data 130 may include expense reports, expense descriptions, metadata associated with expenses (e.g., geotags, dates and times, explanatory notes, and/or another kind of metadata or combination thereof), and/or any other kind of data or combination thereof associated with expenses. Historical expense data 130 may include data that is associated with one or more employees' target activity, which may also be associated (directly or indirectly) with one or more expenses. For example, historical expense data 130 may include one or more itineraries, location check-ins, phone records, emails, social media messages, calendar appointments, and/or any other kind of data or combination thereof associated with business-related activity.

In some embodiments, a data repository 128 is configured to store one or more expense preferences 131. An expense preference 131 includes one or move values that indicates one or more employees' preferences related to expenses that the employee(s) may incur during target activity. For example, an expense preference 131 may indicate that an employee prefers ride sharing over public transportation. As another example, an expense preference 131 may indicate that an employee has a dietary restriction (e.g., vegetarian, vegan, kosher, etc.). As another example, an expense preference 131 may indicate that an employee likes or dislikes a particular restaurant, hotel, or other establishment. An embodiment, an expense reporting service 112 uses a machine learning engine 124 to infer one or more employee preferences 131 from historical expense data 130. One or more triggers described herein may be based, at least in part, on one or more expense preferences 131.

In some embodiments, a data repository 128 is configured to store one or more expense policies 132. An expense policy 132 may be a set of one or more codified rules corresponding to criteria for reimbursable expenses. For example, example, an expense policy 132 may define one or more expense categories that are used to categorize reimbursable expenses (e.g., meals, transportation, incidentals, equipment, etc.). As another example, an expense policy 132 may define an expense limit that is applicable to one or more employees and/or one or more expense categories for a particular unit of time (e.g., day, week, month, year, etc.). As another example, an expense policy 132 may identify one or more kinds of expenses and/or establishments (e.g., particular stores or restaurants) for which expenses are not reimbursable. Many different kinds of expense policy 132 may be defined. An expense policy 132 may apply the level of an entire organization, a business unit, a team, an individual, or any other set of one or more employees or combination thereof.

In some embodiments, a data repository 128 is configured to store one or more expense guidelines 134. An expense guideline 134 may be a set of one or more codified rules corresponding to best practices for expenses and/or responsible spending guidelines. An expense guideline 134 may be more restrictive than an expense policy 132. For example, a particular expense that satisfies an expense policy 132 may fail to satisfy an expense guideline 134 because, even though the expense is within an allowable limit under the expense policy 132, the expense is inconsistent with responsible spending guidelines. An expense guideline 134 may apply the level of an entire organization, a business unit, a team, an individual, or any other set of one or more employees or combination thereof.

In some embodiments, a data repository 128 is configured to store one or more expense patterns 136. An expense pattern 136 identifies a typical and/or expected arrangement of expenses associated with target activity. An expense pattern 136 may be associated with target activity having one or more shared characteristics (e.g., a certain kind of business trip, business-related activity for a particular category of employees, or any other kind of shared characteristic or combination thereof). An expense pattern 136 may identify expenses that are typical for target activity having the shared characteristic(s). In one example, an expense pattern 136 identifies that international business travel typically includes: (1) airfare to and from the destination; (2) a rental car, public transportation, and/or ride sharing at the destination; (3) a hotel for the duration of the trip; (4) an international data roaming plan; and (5) three meals per day at the destination. An expense reporting system 112 may use an expense pattern 136 to identify reimbursable expenses for which an employee may have neglected to submit an expense report (e.g., based on a gap or difference between reported expenses and the expense pattern 136), and/or recommended reimbursable expenses that an employee might otherwise overlook. In some embodiments, an expense reporting service 112 uses a machine learning engine 124 to infer one or more expense patterns 136, based at least in part on historical expense data 130.

In some embodiments, a data repository 128 is configured to store one or more expense triggers 138. An expense trigger 138 is a codified set of rules and/or a set of automatically learned patterns that capture one or more conditions for identifying expenses associated with one or more employees' business-related activity. An expense identified by an expense trigger may be an expense for which an employee has not yet prepared and/or submitted an expense report.

In some embodiments, an expense trigger 138 is based, at least in part, on data corresponding to business-related activity of an employee and/or historical expense data 130. As one example, an expense trigger 138 identifies that a transportation expense may be available when an employee travels from one location to another (e.g., from the employee's home or office to the airport). As another example, an expense trigger 138 identifies that a hotel expense may be available when geolocation data (e.g., from a global positioning system (GPS), a social media check-in, and/or any other kind of data source that supplies geolocation data) indicates that the user has arrived at a hotel or is leaving a hotel. As another example, an expense trigger 138 identifies that a meal expense may be available when geolocation data (e.g., from a global positioning system (GPS), a social media check-in, and/or any other kind of data source that supplies geolocation data) indicates that the user has visited a restaurant.

In some embodiments, when an expense trigger 138 identifies an expense for travel to a location, where return travel is also expected, the expense trigger 138 identifies an expense for the return travel. For example, if an employee prepares an expense description for a taxi to an airport, an expense trigger 138 may identify (e.g., based on an expense pattern 136 for international business travel), a corresponding expense for return travel from the airport.

In some embodiments, an expense trigger 138 is based, at least in part, on one or more expense descriptions prepared by one or more other employees who are traveling with the employee in question. In one example, three employees are participating in the same business trip and two of the employees prepare expense descriptions for a business meal at a particular restaurant. In this example, an expense trigger 138 identify that a corresponding expense at the same restaurant may also apply to the third employee.

In some embodiments, an expense trigger 138 is based, at least in part, on one or more credit card statements for one or more employees. The expense trigger 138 may determine that a particular credit card charge is associated (e.g., corresponds in time and/or geographic location) with an employee's business-related activity. Based on the association between the credit card charge and the employee's business-related activity, the expense trigger 138 may identify the credit card charge as a potentially reimbursable expense.

In some embodiments, an expense trigger 138 is based, at least in part, on a typical and/or expected pairing between two or more different kinds of expenses. In one example, an employee purchases gas at a gas station. However, the employee has not entered an expense description corresponding to a car rental. Based on a typical and expected pairing between gasoline and car rental, an expense trigger 138 may identify a car rental as an available expense for the employee.

In some embodiments, an expense trigger 138 identifies similar expenses over time and identifies an opportunity to enter a recurring expense. As one example, an employee who travels frequently for business submits expense reports each month that include expense descriptions corresponding to an international data roaming plan. An expense trigger 138 may identify the international data roaming plan as a recurring expense. Based on identifying the international data roaming plan as a recurring expense, the expense reporting service 112 may present a message to the employee offering to make the charge a recurring expense, so that the employee does not need to enter the expense description each month.

Many different kinds of expense triggers 138 may be defined. In some embodiments, an expense reporting service 112 uses a machine learning engine 124 to determine an expense trigger 138 as part of a machine learning model 126. Machine learning engine 124 may automatically infer expense triggers even though the exact pattern may not have been seen before. Further, machine learning engine 124 may learn different patterns of behavior that qualify as an expense trigger 138 depending on context. For example, expense triggers may differ depending on employee attributes, such as employee title, clearance level, job responsibilities. Additionally or alternatively, expense triggers may vary between different groups of employees, such as between different companies or organizational departments within the same company. Additionally or alternatively, expense triggers may vary for different temporal patterns, and/or geographic patterns of incurred expenses.

In some embodiments, a data repository 128 is configured to store one or more expense recommendation triggers 139. An expense recommendation trigger 139 is a codified set of rules and/or a set of automatically learned patterns that capture one or more conditions for identifying recommended expenses that are known or expected to be reimbursable. A recommended expense may be an expense that the employee has not yet incurred. In some embodiments, an expense reporting service 112 uses a machine learning engine 124 to determine an expense recommendation trigger 139 as part of a machine learning model 126.

In some embodiments, an expense recommendation trigger 139 is based, at least in part, on data corresponding to business-related activity of an employee and/or historical expense data 130. For example, an expense recommendation trigger 139 may recommend less expensive spending options to an employee who has a tendency to spend above expense limits and/or above expense guidelines. As another example, an expense recommendation trigger 139 may recommend expenses that are popular among similarly situated employees, such as a particular restaurant that other employees have frequented and for which expenses tended to be reimbursed. As another example, an expense recommendation trigger 139 may recommend against frequenting a particular establishment for which expenses tended to be declined.

In some embodiments, an expense recommendation trigger 139 is based, at least in part, on one or more expense preferences 131. For example, an expense recommendation trigger 139 may identify a recommended restaurant for an employee who is vegan or who is meeting with a client who is vegan. As another example, an expense recommendation trigger 139 may identify a recommended restaurant or mode of transportation for an employee who prefers healthy options.

In some embodiments, expense recommendation trigger 139 is based, at least in part, on an expense policy 132 and/or an expense guideline 134. For example, an expense recommendation trigger 139 may identify recommended expenses that increase responsible spending behavior, for example by reducing spending, taking advantage of deals, earning rewards, etc.

In some embodiments, an expense recommendation trigger 139 is based, at least in part, on a determination that one expense is less expensive and/or more likely to be reimbursable than another expense. Recommending less expensive options may reduce expenses for an organization and decrease the incidence of expenses that need to be audited and/or are declined for reimbursement.

In some embodiments, an expense recommendation trigger 139 is based, at least in part, on an employee's spending score. An employee's spending score may be based, at least in part, on historical expense data 130 associated with the employee. For example, the employee spending score may be based on one or more of: whether the employee tends to be below spending limits; an average time that the employee takes to prepare expense descriptions for expenses that have already been incurred; an audit history of the employee (e.g., a history of allowed and/or rejected expense descriptions, which may be expressed as a ratio or some other metric); a comparison of the employee's past spending with a expense policy (e.g., a spending limit); and/or any other kind of data or combination thereof associated with the employee's spending. In some embodiments, employees with 'better' spending scores are at lower risk of audits than employees with 'worse' spending scores. An expense recommendation trigger 139 may identify less expensive options for employees with 'worse' spending scores than for employees with 'better' spending scores.

In some embodiments, an expense recommendation trigger 139 is based on one or more attributes of past, present, and/or planned business-related activity of an employee (e.g., a business trip or another kind of business-related activity). For example, trips of at least a threshold duration may qualify for certain reimbursable expenses (e.g., dry cleaning). As another example, flights of at least a threshold duration may qualify for a reimbursable seat upgrade. As another example, travel to international destinations may qualify for reimbursable international data roaming charges.

In some embodiments, an expense recommendation trigger 139 is based, at least in part, on an expense limit for a trip compared with an amount of expenses already incurred for the trip. For example, an expense recommendation trigger 139 may identify recommended expenses that are less expensive than other options, for an employee who is running out of expense budget on a trip. The expense recommendation trigger 139 may compare a remaining budget with a remaining time on the trip and recommend expenses that allocate the remaining budget across the remaining time.

In some embodiments, an expense recommendation trigger 139 is based, at least in part, on information about employees who are participating in the same business-related activities. For example, an expense recommendation trigger 139 may identify ride-sharing and/or other expense sharing opportunities for employees traveling to the same destination. The system 100 may present the recommended expense to one or more of those employees, to help encourage savings available by sharing expenses.

In some embodiments, a data repository 128 is configured to store one or more approval triggers 140. An approval trigger 140 is a codified set of rules and/or a set of one or more automatically learned patterns that capture one or more conditions for requiring approval of an expense description and/or expense report before submitting the expense description and/or expense report for reimbursement. An approval trigger 140 may be based, at least in part, on data corresponding to business-related activity of an employee and/or historical expense data 130. For example, an approval trigger 140 may indicate that all expense description requires approval if the expense exceeds or is within a certain amount of an expense limit. As another example, an approval trigger 140 may indicate that all expense descriptions in a particular category, and/or all expense descriptions prepared for a particular employee, require approval. As another example, expense descriptions that violate an expense policy 132 and/or an expense guideline 134 may require approval. As another example, employees themselves may be required to approve expense descriptions that are generated by the expense reporting service 112 in a user-independent mode (e.g., based on an expense trigger 138). Many different kinds of approval triggers 140 may be defined. In some embodiments, an expense reporting service 112 uses a machine learning engine 124 to determine an approval trigger 140 as part of a machine learning model 126.

In some embodiments, a data repository 128 is configured to store one or more audit triggers 142. An audit trigger 142 is a codified set of rules and/or a set of automatically learned patterns that capture one or more conditions for requiring auditing of an expense report, and/or for determining that an expense report or description is at risk of being audited. An audit trigger 142 may be based, at least in part, on data corresponding to business-related activity of an employee and/or historical expense data 130. In some embodiments, an audit trigger 142 is based, at least in part, on an audit risk score associated with a particular expense description. An audit trigger 142 may be satisfied when an audit risk score satisfies one or more threshold criteria (e.g., the audit risk score may be above or below a threshold number, or any other kind of threshold criteria or combination thereof). In some embodiments, an expense reporting service 112 uses a machine learning engine 124 to determine an audit trigger 142 as part of a machine learning model 126.

In some embodiments, a data repository 128 is configured to store one or more user credentials 144. An expense reporting service 112 may use a user credential 144 to access an external data source 146 and obtain data from the external data source 146. A user credential 144 may include a username, user identifier (ID), password, private key, public key, and/or any other kind of credential or combination thereof. In some embodiments, an employee supplies a user credential 144 to an expense reporting system 122 via a graphical user interface. For example, the expense reporting service 112 may use three-party authentication to obtain a user credential 144 from an employee.

In some embodiments, user data that is input into machine learning engine 124 is anonymized. Personal identifying information (PII) and other sensitive information may be replaced with an anonymous identifier, such as a cryptographic hash of the user data. Machine learning engine 124 may use the anonymized data to learn patterns and make predictions for different employees, within the same or different organizations, having similar attributes without compromising or revealing sensitive employee data.

Information describing one or more components that are illustrated here within a data repository 128 may be implemented across any of components within the system 100. However, this information is illustrated within the data repository 128 for purposes of clarity and explanation.

In some embodiments, an expense reporting service 112 is configured to receive data from one or more external data sources 146. An external data source 146 refers to hardware and/or software operating independent of the expense reporting service 112, i.e., under control of a different entity (e.g., a different company or other kind of organization) than an entity that controls the expense reporting service 112. An external data source 146 may supply data associated with an employee's business-related activity, such as travel, dining, meals, itineraries, appointments, emails, phone data, social media messages, credit card statements (e.g., for a business-provided credit card), and/or any other kind of target activity or combination thereof. The data may include information associated with an employee's expenses, which may or may not be reimbursable.

Some examples of an external data source 146 supplying data to an expense reporting service 112 include, but are not limited to: an airline or travel agency supplying data associated with an itinerary and/or ticket purchase; a food ordering application supplying data associated with a food order; a ride sharing service (e.g., Uber™, Lyft™, or another ride sharing service) supplying data associated with an instance of ride sharing; and a social media application (e.g., Facebook™, Foursquare™, or another social media application) supplying data corresponding to a check-in at a location (e.g., a restaurant, hotel, entertainment venue, or other location). Many different kinds of external data sources 146 may supply many different kinds of data.

In some embodiments, an expense reporting service 112 is configured to retrieve data from an external data source 146 by 'pulling' the data via an application programming interface (API) of the external data source 146, using user credentials 144 that a user has provided for that particular external data source 146. Alternatively or additionally, an external data source 146 may be configured to 'push' data to the expense reporting service 112 via an API of the expense reporting service, using an access key, password, and/or other kind of credential that a user has supplied to the external data source 146. An expense reporting service 112 may be configured to receive data from an external data source 146 in many different ways.

In some embodiments, a reimbursement service 148 refers to hardware and/or software configured to perform operations for reimbursing approved expenses. For example, the reimbursement service 148 may be part of an accounting service that applies reimbursements for approved expenses to employee's paychecks and/or separate reimbursement checks, which may be mailed to employees and/or direct-deposited into employee's bank accounts. Many different techniques for reimbursing approved expenses exist.

In some embodiments, an expense reporting service 112 includes or interfaces with an intelligent agent. An intelligent agent may comprise an autonomous virtual persona that interacts via natural language with one or more users. For example, users may provide natural language queries by speaking, which may be captured through the microphone of a smart speaker or other microphone-enabled network device. As another example, users may type and submit natural language queries via a chatbot application or web interface. The intelligent agent may use natural language processing and machine learning techniques described further herein to process the queries and provide relevant responses. The responses may be output via a speaker, display, or other user interface.

In some embodiments, one or more components of the system 100 implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. EXPENSE REPORT SUBMISSION

Figure 2:
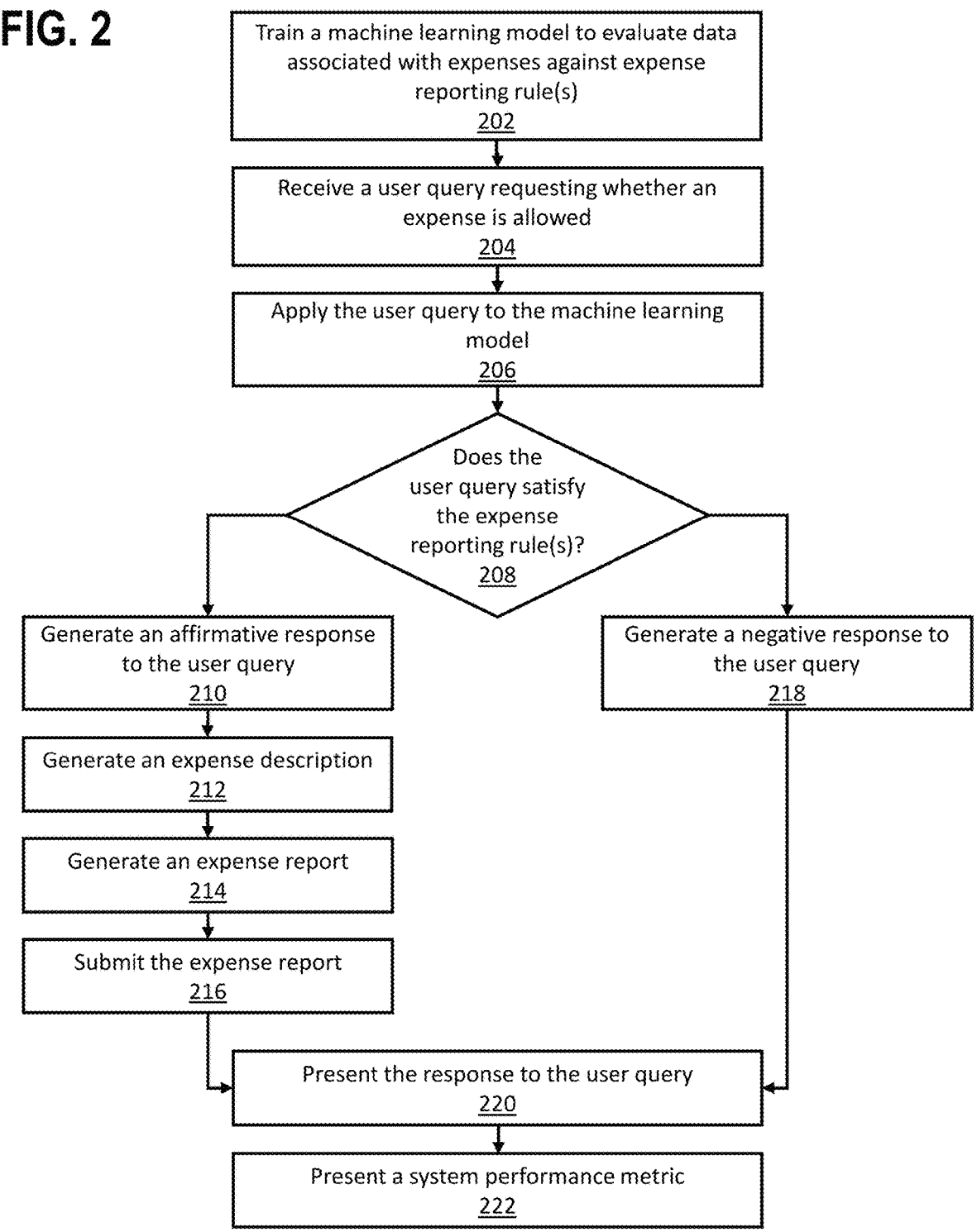
FIG. 2 illustrates a set of operations for expense report submission in accordance with some embodiments.

FIG. 2 illustrates an example set of operations for expense report submission in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

In some embodiments, a system (e.g., one or more components of system 100 illustrated in FIG. 1) trains a machine learning model to evaluate data associated with expenses against one or more expense policy rules (Operation 202). The expense reporting rule(s) may include one or more expense policies. Alternatively or additionally, the expense reporting rule(s) may include one or more expense guidelines. The system may train the machine learning model using labeled training data, which may include expense-related data that is labeled to indicate whether or not the expense-related data satisfies the expense reporting rule(s).

In some embodiments, the system receives a user query, from an employee, requesting whether an expense is allowed (Operation 204). The system may receive the user query as text data, voice data, or any other kind of user query. The expense may be an expense that the employee has already incurred. Alternatively, the expense may be a planned or anticipated expense that the employee has not yet incurred. The user query may be in a natural language format. For example, the user may submit a query asking, "Can I expense international data charges?"

In an embodiment, the system applies the user query (which may optionally be subjected to semantic analysis) to the machine learning model (Operation 206). Based at least in part on output of the machine learning model, the system determines whether the user query satisfies the expense reporting rule(s) (Operation 208). Alternatively or additionally, the system may apply data other than the user query to the machine learning model. In one example, the user query corresponds to a question about reimbursable expenses associated with a business trip. The system may apply data associated with the business trip (e.g., dates of travel, origin and/or destination(s), parties in attendance, purpose of the trip, and/or any other kind of data or combination thereof associated with the business trip). In an embodiment, an expense is reimbursable if it satisfies the expense reporting rule(s) and is not reimbursable if it does not satisfy the expense reporting rule(s).

In an embodiment, if the user query does not satisfy the expense reporting rule(s), the system generates a negative response to the user query (Operation 218). The negative response indicates that the expense is not allowed. In addition, the negative response may include an explanation of why the expense is not allowed, based on the relevant reporting rule(s). The negative response may include information about expenses that are reimbursable, even if the expense indicated by the user query is not reimbursable. In one example, a user query asks, "Can I expense a meal at The French Laundry?" In this example, the system responds, "No, but you can expense a meal at Panera," because any meal the employee might purchase at The French Laundry would exceed the employee's expense limit, while a typical meal at Panera would not exceed the employee's expense limit.

In an embodiment, if the user query satisfies the expense reporting rule(s), the system generates an affirmative response to the user query (Operation 210). The affirmative response indicates that the expense indicated by the user query is not reimbursable. Even if the expense is allowed, the affirmative response may include a warning indicating that the expense is likely to trigger an audit and/or may otherwise not be approved, despite satisfying the expense reporting rule(s). The response may include information to assist the employee in avoiding an audit. In one example, a user query asks, "Can I expense a meal at Panera?" In this example, the system responds, "Yes, as long as you do not spend more than $25."

In an embodiment, based at least in part on information in a user query, the system generates an expense description (Operation 212). The system may receive an initial user query requesting whether an expense is allowed, and a subsequent user query instructing the system to generate the expense description that the system indicated was allowed. In general, the system may generate the expense description responsive to a series of user queries and not only a single user query. The system may generate the expense description in user-independent mode, i.e., without requiring or requesting any user input corresponding to an instruction to generate the expense description. In one example, a user query asks, "Can I expense data roaming for my London trip?" In this example, the system responds, "Yes. I've gone ahead and added data roaming to your expense report for your London trip," even though the employee did not explicitly instruct the system to generate an expense description for data roaming. The system may generate the expense description based on historical expense data and/or other data that supplies information for populating the fields of the corresponding expense description.

In an embodiment, the system generates an expense report that includes the expense description (Operation 214). The system may generate the expense report in user-independent mode, i.e., without requiring or requesting any user input corresponding to an instruction to generate the expense report. In one example, a user query asks, "Can I expense my meals from my last trip?" In this example, the system responds, "Yes. I've gone ahead and prepared an expense report for all the meals from your last trip," even though the employee did not explicitly instruct the system to generate an expense report for the meals.

In an embodiment, the system submits the expense report (Operation 216). The system may submit the expense report in user-independent mode, i.e., without requiring or requesting any user input corresponding to an instruction to submit the expense report.

In an embodiment, the system presents the response to the user query (Operation 220) in a graphical user interface (GUI). As discussed above, the response may be positive or negative. The response may be in a natural language format. The response may prompt the user for additional information to be supplied in a subsequent user query. As noted above, one or more operations performed by the system may be performed responsive to a series of user queries. A user and the system may engage in a series of queries and responses resembling a conversation. In an embodiment, the system presents the response as coming from a virtual assistant persona, such that the user query and response have the appearance of a natural language conversation between the employee and the virtual assistant persona.

In an embodiment, the system presents a system performance metric (Operation 222) in a graphical user interface (GUI). The system performance metric may indicate how long it took for the system to complete one or more expense reporting operations, responsive to user input and/or in a user-independent mode. For example, the system performance metric may indicate how long the system took to generate an expense description (optionally in a user-independent mode), and/or generate an expense report (optionally in a user-independent mode), and/or submit an expense report (optionally in a user-independent mode). The system may present many different kinds of system performance metrics.

4. MACHINE LEARNING BASED QUERY PROCESSING

As previously indicated, the expense reporting service 112 may leverage machine learning to respond (e.g., via an intelligent agent interface) to expense queries. Machine learning allows expense reporting service 112 to perform tasks and capture patterns that are not hard-coded or otherwise explicitly programmed into the system. Machine learning further allows expense reporting service 112 to adapt to different application use-cases and evolve over time without requiring complex reprograming or other changes in the underlying application code.

Figure 3:
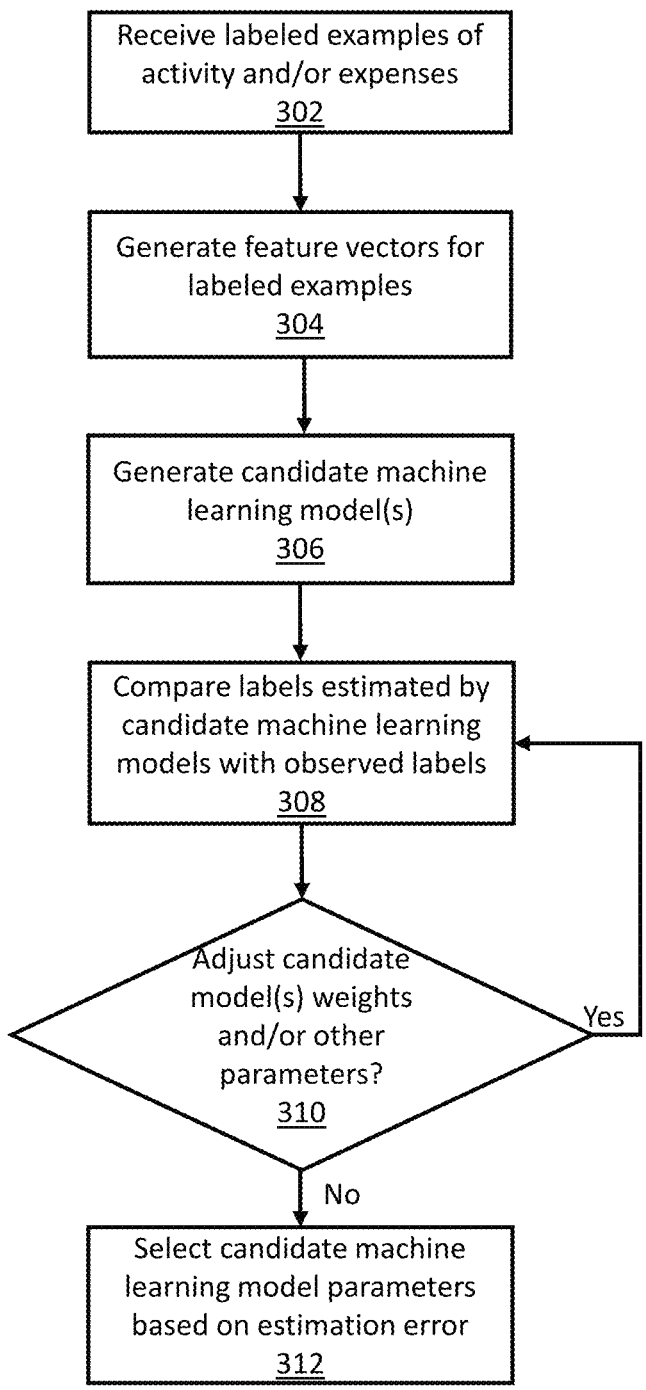
FIG. 3 illustrates an example set of operations for training a machine learning model to estimate unknown labels for expense patterns in accordance with some embodiments.

FIG. 3 illustrates an example set of operations for training a machine learning model to estimate unknown labels for expense patterns in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

In some embodiments, a system (e.g., one or more components of system 100 illustrated in FIG. 1) receives a set of labeled examples of target activity and/or expenses for training a machine learning model (Operation 302). An example in the training dataset may include one or more labels, where a label corresponds to a classification for one or more activities and/or one or more expenses. For example, a label may indicate whether an activity or set of activities incurred reimbursable expenses or not. As another example, a label may indicate whether an expense required approval or not from another user before reimbursement. As yet another example, a label may indicate how an expense was categorized.

In some embodiments, examples in the training set include multiple expenses and/or activities that are related. For instance, a single example may include a set of expenses and/or activities that were incurred by an employee on a single business trip. In this instance, the expenses and activities may be related (a) temporally since the expenses are likely to have occurred within a relatively short timeframe of the trip; (b) geographically since the trip was likely constrained to a limited number of locations; and (c) by entity since the expenses were incurred by the same employee.

In some embodiments, the system generates a set of feature vectors for the labeled examples (Operation 304). A feature vector for an example may be n-dimensional, where n represents the number of features in the vector. The number of features that are selected may vary depending on the particular implementation. The features may be curated in a supervised approach or automatically selected from extracted attributes during model training and/or tuning. Example features include information about the employee that incurred an expense (e.g., employee job title, clearance level, department), geographic information about where an expense or activity occurred (e.g., continent, country, state, city), temporal information about when an expense or activity occurred (e.g., date and time), categorical information about what type of an expense was incurred or activity performed (e.g., vendor identifier, vendor category, product identifier, product category, activity name, activity patterns), and the expense amount. Additionally or alternatively, the feature vector may include values associated with an expense policy of an organization, such as rules about what types of expenses are not permissible and/or the conditions under which an expenses is reimbursable. In some embodiments, a feature within a feature vector is represented numerically by one or more bits. The system may convert categorical attributes to numerical representations using an encoding scheme, such as one hot encoding.

In some embodiments, the system generates one or more candidate machine learning models that apply weights as a function of extracted features (Operation 306). In some cases, the system may generate and train a candidate recurrent neural network model, such as a long short-term memory (LSTM) model. With recurrent neural networks, one or more network nodes or "cells" may include a memory. A memory allows individual nodes in the neural network to capture dependencies based on the order in which feature vectors are fed through the model. The weights applied to a feature vector representing one expense or activity may depend on its position within a sequence of feature vector representations. Thus, the nodes may have a memory to remember relevant temporal dependencies between different expenses and/or activities. For example, a dinner expense in isolation may have a first set of weights applied by nodes as a function of the respective feature vector for the expense. However, if the dinner expense is immediately preceded by an earlier dinner expense, then a different set of weights may be applied by one or more nodes based on the memory of the preceding expense. In this case, whether the second dinner expense is reimbursable or not may be affected by the first dinner expense. As another example, one or more nodes may apply different weights if an expense is unique or a duplicate of another expense on the same day. In this case, the trained machine learning model may automatically filter out and reject duplicate expenses made on the same day while recurring expenses (e.g., monthly subscriptions) may be permitted. Additionally or alternatively, the system may generate and train other candidate models, such as support vector machines, decision trees, Bayes classifiers, and/or fuzzy logic models, as previously described.

In some embodiments, the system compares the labels estimated through the one or more candidate models with observed labels to determine an estimation error (Operation 308). The system may perform this comparison for a test set of examples, which may be a subset of examples in the training dataset that were not used to generate and fit the candidate models. The total estimation error for a candidate may be computed as a function of the magnitude of the difference and/or the number of examples for which the estimated label was wrongly predicted.

In some embodiments, the system determines whether to adjust the weights and/or other model parameters based on the estimation error (Operation 310). Adjustments may be made until a candidate model that minimizes the estimation error or otherwise achieves a threshold level of estimation error is identified. The process may return to Operation 308 to make adjustments and continue training the machine learning model.

In some embodiments, the system selects a candidate machine learning model parameters based on the estimation error (Operation 312). For example, the system may select a machine learning model having weights and other model parameters (e.g., selected feature combinations used to form the feature vectors) that yield the lowest estimation error for the test dataset.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. As previously mentioned, a given example may include a sequence of related expenses and/or activities incurred on a trip. Each expense or activity may be processed as a separate discrete instance of time. For instance, an example may include expenses $e_1$, $e_2$, and $e_3$ corresponding to times t, t+1, and t+2, respectively. Backpropagation through time may perform adjustments through gradient descent starting at time t+2 and moving backward in time to t+1 and then to t. Further, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one expense or activity to a cell's output may affect the contribution of the next expense or activity in the cell's output. Thus, the contribution of $e_1$ may affect the contribution of $e_2$, etc.

Additionally or alternatively, the system may train other types of machine learning models. For example, the system may adjust the boundaries of a hyperplane in a support vector machine or node weights within a decision tree model to minimize estimation error. Once trained, the machine learning model may be used to estimate labels for new examples of expenses.

Figure 4:
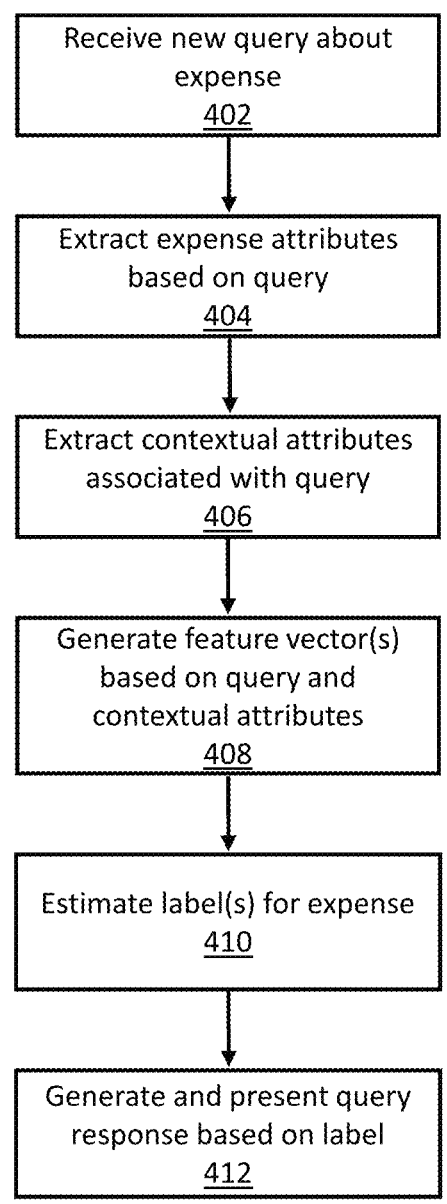
FIG. 4 illustrates an example set of operations for applying queries to a trained machine learning model in accordance with some embodiments.

FIG. 4 illustrates an example set of operations for applying queries to a trained machine learning model in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

In some embodiments, the system (e.g., one or more components of system 100 illustrated in FIG. 1) receives a new query about an expense (Operation 402). The query may be written in a natural language or conform to a query language syntax. The query may be submitted via an intelligent agent interface, such as via a smart speaker or chatbot application.

In some embodiments, the system extracts expense attributes based on the new query (Operation 404). An intelligent agent may use natural language processing to extract expense attributes, such as the expense amount, expense category, and expense location. One or more of the expense attributes may be extracted from metadata associated with the query. For example, an expense location may be extracted from a geo-tag provided via a mobile application. Additionally or alternatively, an intelligent agent may map the query to one or more intents, where an intent represents an available action that the querying entity intends to be executed. The intelligent agent may determine what attributes to extract based on the one or more intents.

In some embodiments, the system extracts contextual attributes associated with the query (Operation 406). Contextual attributes may include attributes about the user that submitted the query, such as the employer job title, spending score, and audit risk. Additionally or alternatively, contextual attributes may include attributes about other expenses that have been incurred by the user, such as information about the expense amounts, categories, and geographic locations of expenses incurred within a threshold timeframe (e.g., within a given week, month, or year, or on a particular trip). Additionally or alternatively, contextual attributes may include attributes about expense policies defined by the employer or other organization which employs the user.

In some embodiments, the system generates a set of one or more feature vectors based on the query and contextual attributes (Operation 408). In some embodiments, the system uses the same combinations of features used to train the machine learning model. The system may generate a set of features vectors where one or more feature vectors represent expenses incurred by the employee within a threshold timeframe and another feature vector represents a proposed expense queried about by the user. In other embodiments, the proposed expense may be applied to the machine learning model in isolation of any expenses previously incurred by the employee. The one or more feature vectors may be a unique example such that the combination of feature values and/or sequence of feature vectors was not included in the training dataset.

In some embodiments, the system inputs the set of one or more feature vectors to the trained machine learning model to estimate a label for the expense that is the subject of the query (Operation 410). In the case of a recurrent neural network, for example, the system may perform forward propagation using a sequence of feature vectors representing different expenses and/or activities in the order that the expenses and/or activities occurred. As another example, in the case of a support vector machine, the system may compute a location in the hyperplane for the feature vector relative to the hyperplane boundaries. As another example, the system may follow a decision tree as a function of the input set of one or more feature vectors.

In some embodiments, the estimated label corresponds to a classification for an expense or activity queried about by the user. The estimated label may be output by the machine learning model as a function of the one or more input feature vector and the patterns learned from the training dataset. For example, the trained machine learning model may classify an expense as "reimbursable" or "non-reimbursable". As another example, the trained machine learning model may classify an activity, queried about by the user, as an expense trigger or not an expense trigger. Additionally or alternatively, the trained machine learning model may map an activity or expense to a category, such as travel, dining, continuing learning education, office supplies, software licenses, promotional material, etc. Additionally or alternatively, the trained machine learning model may output other classifications depending on the labels that are input.

In some embodiments, a label includes a numerical value. For example, a machine learning model may be trained to estimate a percentage or amount of an expense that is reimbursable for a given expense. The corresponding feature vector may be fed as input to the trained model, which may output an estimated percentage or amount based on patterns learned from the training dataset.

In some embodiments, the system generates and presents a query response based on the estimated label (Operation 412). For example, if the estimated label indicates that a queried about expense is reimbursable or not reimbursable, then an intelligent agent may notify the user, such as via a smart speaker or chatbot interface. The intelligent agent may further provide reasons why the expense was classified as reimbursable or not reimbursable based on the learned patterns. For example, the intelligent agent may indicate that the expense is not reimbursable by employees having a score lower than a threshold amount, with a particular job title, or with a recent pattern of spending, depending on the application of the query to the machine learning model.

Additionally or alternatively, the system may perform other automated actions based on the estimated label. For example, the system may automatically add the expense to an expense report, such as previously described, if the estimated label indicates that the expense is reimbursable. If the estimated label indicates that the expense is not reimbursable, then the system may prevent the expense from being added to the electronic expense report. Additionally or alternatively, the system may present alternative expense options with similar feature vectors that would be classified as reimbursable.

5. ILLUSTRATIVE EXAMPLES

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
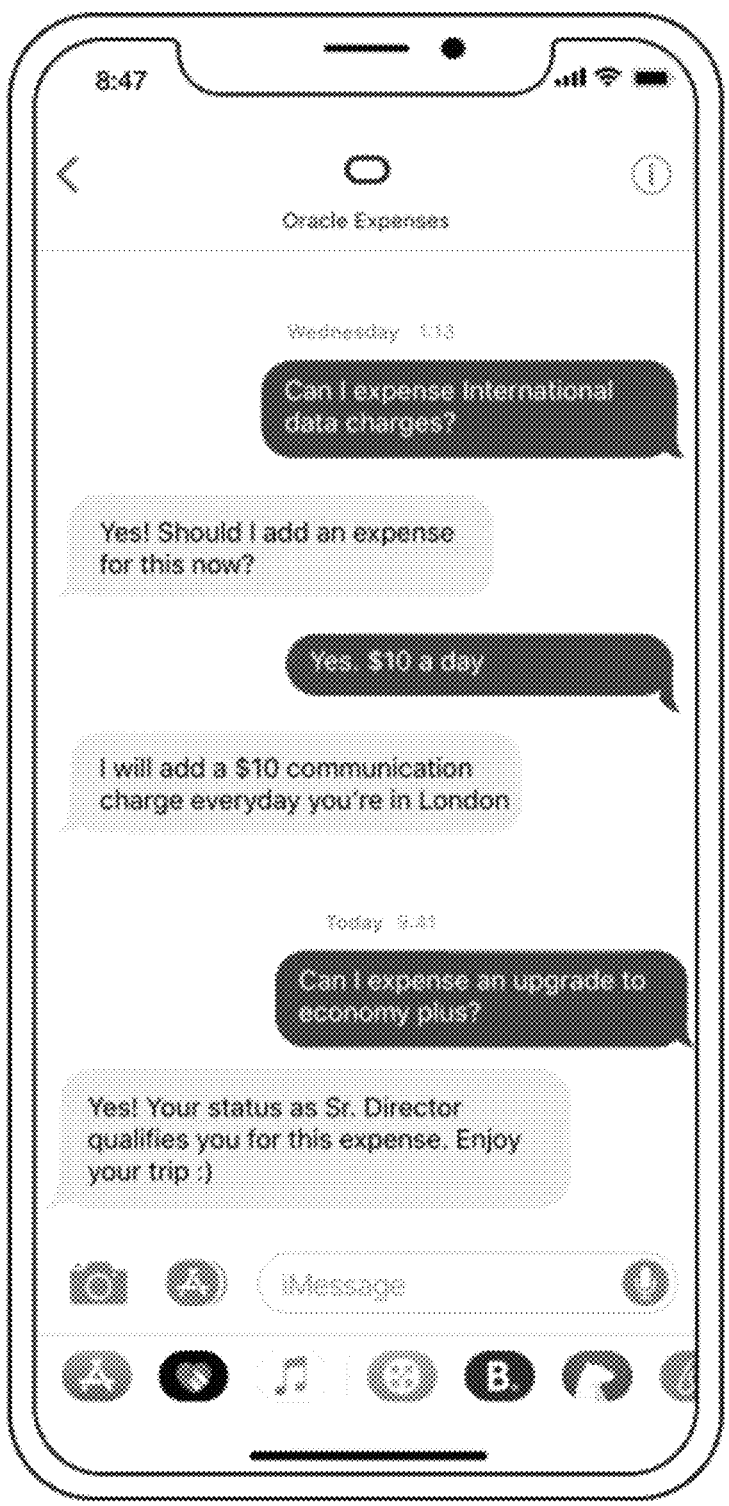
FIGS. 5A-5B illustrate examples in accordance with some embodiments.
Figure 5B:
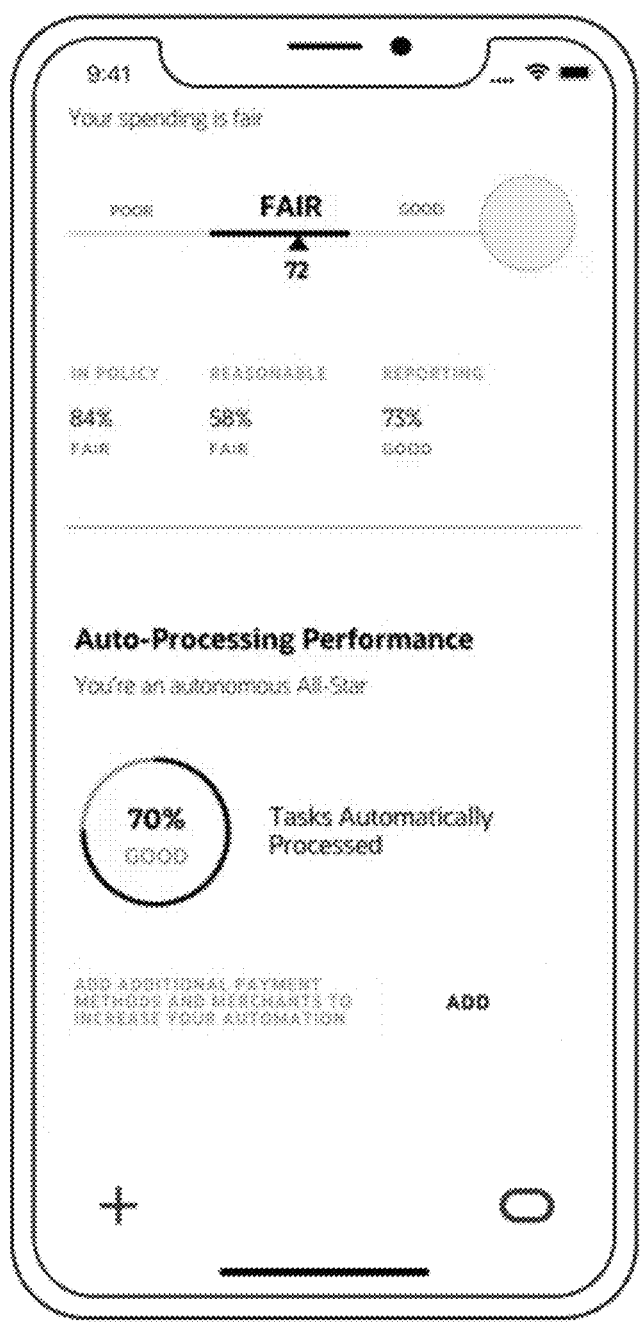

FIGS. 5A-5B illustrate examples in accordance with some embodiments. FIG. 5A illustrates a dialogue between an employee and a virtual assistant persona. The employee enters user input corresponding to user queries, and the system generates and presents responses to each user query. In this example, the employee learns that they can expense international data charges and instructs the system to add one or more expense descriptions corresponding to $10 per day. The system detects that the employee is going on a trip to London, infers that the charges are for that trip, and generates one or more expense descriptions corresponding to $10 per day in international data charges for the duration of the trip. In addition, responsive to a user query, the system informs the employee that the expense policy for their organizational role (i.e., senior director) allows them to expense an upgrade to economy plus. While not shown in FIG. 5A, the system may generate an expense description corresponding to the upgrade to economy plus, based on flight data available to the system. The system may also request the upgrade on behalf of the employee. In addition, the system may add one or more expense descriptions to an expense report for the employee (optionally without further input from the user), and may submit the expense report (optionally without further input from the user).

FIG. 5B illustrates examples of system performance metrics. In addition, the example illustrated in FIG. 5B illustrates an employee's spending score. In this example, the employee's spending score is 72, which the system classifies as "fair." The system presents multiple spending scores, corresponding to different types of expense reporting behavior: "in policy," referring to the employee's tendency to submit expense descriptions that satisfy expense policies; "reasonable," referring to the employee's tendency to submit descriptions that satisfy expense guidelines (in this example, the employee has submitted some number of expense descriptions that satisfy a policy but exceed a guideline); and "reporting," corresponding to the timeliness and/or accuracy of the employee's expense reporting. In this example, the system performance metric is for "auto-processing performance," referring to expense reporting operations completed by the system in a user-independent mode. The system performance metric is 70%, which the system classifies as "good." In addition the system presents information about how the employee can improve the system performance metric, in this example by adding information about payment methods and/or merchants to permit the system to perform more expense reporting operations in a user-independent mode.

6. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. COMPUTER NETWORKS AND CLOUD NETWORKS

In some embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. MICROSERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud. In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
   training a machine learning model using a set of labelled expense data to estimate whether expenses are allowed under one or more expense policy rules, wherein the machine learning model comprises a neural network including cells with memory, wherein training the machine learning model comprises:
      determining an estimation error for the neural network;
      assigning, by a backpropagation process, a fraction of the estimation error to a cell in the neural network;
      performing unsupervised adjustments to one or more memory parameters of the cell in the neural network based at least in part on the fraction of the estimation error assigned to the cell by the backpropagation process; and
      selecting a set of memory parameters for the neural network based at least in part on the estimation error;
   receiving, by an expense report submission system via a graphical user interface, a first user query inquiring whether a particular expense is allowed, wherein the first user query is a natural language query that is received prior to the particular expense being incurred;
   generating at least one feature vector based at least in part on the natural language query;
   inputting the at least one feature vector into the trained machine learning model to generate, by the trained machine learning model, an estimated label for the particular expense;
   generating, by the expense report submission system, a response to the first user query based at least on the estimated label for the particular expense, wherein the response to the first user query indicates whether the expense is allowed; and
   presenting, by the expense report submission in the graphical user interface, the response to the first user query.

2. The one or more media of claim 1, wherein the particular expense is associated with a particular instance of business travel;
   wherein the at least one feature vector is further generated based on attributes associated with the particular instance of business travel.

3. The one or more media of claim 1, wherein the response to the first user query indicates that the particular expense is not allowed and comprises an explanation based at least on the one or more expense policy rules.

4. The one or more media of claim 1, wherein the one or more expense policy rules comprise a company spending policy.

5. The one or more media of claim 1, wherein the one or more expense policy rules comprise a responsible spending policy that is more restrictive than a company spending policy.

6. The one or more media of claim 1, wherein the one or more expense policy rules comprise at least one expense reporting rule that is specific to an employee submitting the first user query.

7. The one or more media of claim 1, further storing instructions which, when executed by one or more processors, cause:

receiving, by the expense report submission system via the graphical user interface, a second user query that corresponds to a request to generate an expense description;

responsive to the second user query: generating, by the expense report submission system, the expense description.

8. The one or more media of claim 1, further storing instructions which, when executed by one or more processors, cause:

generating, by the expense report submission system, an expense report comprising an expense description corresponding to the particular expense.

9. The one or more media of claim 8, further storing instructions which, when executed by one or more processors, cause:

submitting, by the expense report submission system, the expense report without receiving any user input corresponding to an instruction to submit the expense report.

10. The one or more media of claim 1, further storing instructions which, when executed by one or more processors, cause: presenting, by the expense report submission system in the graphical user interface, a system performance metric corresponding to a performance in completing one or more tasks associated with the particular expense.

11. The one or more media of claim 10, wherein the system performance metric indicates an amount of time taken to generate an expense description corresponding to the particular expense.

12. The one or more media of claim 10, wherein the system performance metric indicates a percentage of operations completed by the expense report submission system in a user-independent mode.

13. The one or more media of claim 1, wherein the response to the first user query is a natural language response.

14. The one or more media of claim 1, wherein the expense report submission system presents the response to the first user query in the graphical user interface in association with a virtual assistant persona.

15. The one or more media of claim 1, wherein the instructions further cause:

performing at least one of a forward pass or a distance calculation as a function of at least the at least one feature vector and the machine learning model.

16. The one or more media of claim 15, wherein the instructions further cause:

generating at least a second feature vector based on attributes associated with one or more other expenses incurred by a user that submitted the first user query; and wherein the at least one forward pass or distance calculation is further performed as a function of the second feature vector.

17. The one or more media of claim 1, wherein the machine learning model is a recurrent neural network.

18. A system comprising:
at least one device including a hardware processor;
the system being configured to perform:
training a machine learning model using a set of labelled expense data to estimate whether expenses are allowed under one or more expense policy rules, wherein the machine learning model comprises a neural network including cells with memory, wherein training the machine learning model comprises:
determining an estimation error for the neural network;
assigning, by a backpropagation process, a fraction of the estimation error to a cell in the neural network;
performing unsupervised adjustments to one or more memory parameters of the cell in the neural network based at least in part on the fraction of the estimation error assigned to the cell by the backpropagation process; and
selecting a set of memory parameters for the neural network based at least in part on the estimation error;
receiving, by an expense report submission system via a graphical user interface, a first user query inquiring whether a particular expense is allowed, wherein the first user query is a natural language query that is received prior to the particular expense being incurred;
generating at least one feature vector based at least in part on the natural language query;
inputting the at least one feature vector into the trained machine learning model to generate, by the trained machine learning model, an estimated label for the particular expense;
generating, by the expense report submission system, a response to the first user query based at least on the estimated label for the particular expense, wherein the response to the first user query indicates whether the expense is allowed; and
presenting, by the expense report submission in the graphical user interface, the response to the first user query.

19. The system of claim 18, wherein the particular expense is associated with a particular instance of business travel;
wherein the at least one feature vector is further generated based on attributes associated with the particular instance of business travel.

20. A method comprising:
training a machine learning model using a set of labelled expense data to estimate whether expenses are allowed under one or more expense policy rules, wherein the machine learning model comprises a neural network including cells with memory, wherein training the machine learning model comprises:
determining an estimation error for the neural network;
assigning, by a backpropagation process, a fraction of the estimation error to a cell in the neural network;
performing unsupervised adjustments to one or more memory parameters of the cell in the neural network based at least in part on the fraction of the estimation error assigned to the cell by the backpropagation process; and
selecting a set of memory parameters for the neural network based at least in part on the estimation error;

receiving, by an expense report submission system via a graphical user interface, a first user query inquiring whether a particular expense is allowed, wherein the first user query is a natural language query that is received prior to the particular expense being incurred;

generating at least one feature vector based at least in part on the natural language query;

inputting the at least one feature vector into the trained machine learning model to generate, by the trained machine learning model, an estimated label for the particular expense;

generating, by the expense report submission system, a response to the first user query based at least on the estimated label for the particular expense, wherein the response to the first user query indicates whether the expense is allowed; and presenting, by the expense report submission in the graphical user interface, the response to the first user query.

* * * * *